United States Patent
Liu et al.

(10) Patent No.: US 12,316,144 B2
(45) Date of Patent: May 27, 2025

(54) BATTERY CHARGING METHOD AND VEHICLE ELECTRICAL SYSTEM FOR CONTROLLING CHARGING CURRENT BASED ON TEMPERATURE OF BATTERY

(71) Applicant: CONTEMPORARY AMPEREX TECHNOLOGY (HONG KONG) LIMITED, Hong Kong (CN)

(72) Inventors: Diping Liu, Ningde (CN); Yu Yan, Ningde (CN); Xiyang Zuo, Ningde (CN); Xianxi Pan, Ningde (CN); Bao Li, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 365 days.

(21) Appl. No.: 17/940,318

(22) Filed: Sep. 8, 2022

(65) Prior Publication Data
US 2023/0208149 A1   Jun. 29, 2023

Related U.S. Application Data (63) Continuation of application No. PCT/CN2022/089334, filed on Apr. 26, 2022.

(30) Foreign Application Priority Data

Dec. 29, 2021 (CN) .......................... 202111631807.1

(51) Int. Cl.
*H02J 7/00* (2006.01)
(52) U.S. Cl.
CPC ........ *H02J 7/00034* (2020.01); *H02J 7/0032* (2013.01); *H02J 7/00716* (2020.01)

(58) Field of Classification Search
CPC .................................................. H02J 7/00034
(Continued)

(56) References Cited

U.S. PATENT DOCUMENTS

2013/0192272 A1* 8/2013 Ranalli .................. B60L 1/003
62/3.3
2014/0004393 A1   1/2014 Takahashi et al.
(Continued)

FOREIGN PATENT DOCUMENTS

CN   106965700 A     7/2017
CN   110435478      * 11/2019
(Continued)

OTHER PUBLICATIONS

The Japan Patent Office (JPO) Notification of Reasons for Refusal for Application No. 2022-548238 and Translation Feb. 13, 2024 10 Pages.
(Continued)

*Primary Examiner* — Yalkew Fantu
(74) *Attorney, Agent, or Firm* — ANOVA LAW GROUP, PLLC (57) ABSTRACT

A battery charging control method applicable to a vehicle electrical system that includes a current control unit including a semiconductor device. Two ends of the current control unit are connected to a battery and a charging power supply, respectively. The method includes controlling, when a temperature of the battery is below a preset temperature, the current control unit to be in a first state in which the semiconductor device is reversely connected in a circuit, sending a first charging request including a first charging current required to heat the battery to the preset temperature, controlling, when the temperature of the battery reaches the preset temperature, the current control unit to be in a second state in which the semiconductor device is disconnected (Continued)

from the circuit or forwardly connected in the circuit, and sending a second charging request including a second charging current at which the battery is charged.

7 Claims, 5 Drawing Sheets

(58) Field of Classification Search
USPC .......................................................... 320/106
See application file for complete search history.

(56) References Cited

U.S. PATENT DOCUMENTS

| | | | | |
|---|---|---|---|---|
| 2015/0244192 | A1* | 8/2015 | Dauchy | H02J 7/00302 |
| | | | | 320/152 |
| 2018/0069272 | A1* | 3/2018 | Seo | B60L 3/0046 |
| 2020/0130535 | A1* | 4/2020 | Robert | H02J 7/007194 |

FOREIGN PATENT DOCUMENTS

| | | | |
|---|---|---|---|
| CN | 110435478 | A | 11/2019 |
| CN | 113479098 | A | 10/2021 |
| CN | 214672757 | U | 11/2021 |
| CN | 113746171 | A | 12/2021 |
| CN | 114228572 | A | 3/2022 |
| EP | 3575124 | A1 | 12/2019 |
| JP | 2006288150 | A | 10/2006 |
| JP | 2014030340 | A | 2/2014 |
| JP | 2021002992 | A | 1/2021 |
| WO | 2014003085 | A1 | 1/2014 |
| WO | 2017115091 | A1 | 7/2017 |

OTHER PUBLICATIONS

Korean Intellectual Property Office (KIPO) Request for the Submission of an Opinion for Application No. 10-2022-7027718 Apr. 15, 2024 10 Pages (including translation).

The European Patent Office (EPO) Extended Search Report for EP Application No. 22747232.1, Jul. 19, 2023 53 Pages.

The World Intellectual Property Organization (WIPO) International Search Report and written opinion for PCT/CN2022/089334 Sep. 13, 2022 14 pages (including English translation).

* cited by examiner

FIG. 8

BATTERY CHARGING METHOD AND VEHICLE ELECTRICAL SYSTEM FOR CONTROLLING CHARGING CURRENT BASED ON TEMPERATURE OF BATTERY

CROSS-REFERENCE TO RELATED APPLICATIONS

The present application is a continuation of International Application No. PCT/CN2022/089334, filed on Apr. 26, 2022, which claims priority to Chinese patent application 202111631807.1 filed on Dec. 29, 2021 and entitled "BATTERY CHARGING METHOD AND VEHICLE ELECTRICAL SYSTEM," the entire contents of both of which are incorporated herein by reference.

TECHNICAL FIELD

The present application relates to the technical field of batteries and, in particular, to a battery charging method and a vehicle electrical system.

BACKGROUND ART

With the rapid development of new energy batteries, electric vehicles have become a new direction for the future development of the automotive industry. Power battery technology is becoming more and more mature, and users have higher requirements for the charging speed and safety of power batteries. However, the current commonly used charging piles cannot safely and efficiently charge low state-of-charge (SOC) power batteries in low-temperature environments, which limits the functions and application of the charging piles.

SUMMARY

The present application provides a battery charging method and a vehicle electrical system that enable charging piles to safely and efficiently charge low-SOC power batteries in low-temperature environments.

In a first aspect, the present application provides a battery charging control method that is applicable to a vehicle electrical system. The vehicle electrical system includes a current control unit that includes a semiconductor device, one end of the current control unit being connected to a battery and the other end being connected to a charging power supply. The battery charging control method includes: controlling, when the temperature of the battery is below a first preset temperature, the current control unit to be in a first state, wherein the first state includes a state in which the semiconductor device is reversely connected in a circuit; sending a first charging request, wherein the first charging request includes a first charging current, which is a current required to heat the battery to the first preset temperature; controlling, when the temperature of the battery reaches the first preset temperature, the current control unit to be in a second state, wherein the second state includes a state in which the semiconductor device is disconnected from the circuit or a state in which the semiconductor device is forwardly connected in the circuit; and sending a second charging request, wherein the second charging request includes a second charging current at which the battery is charged.

The embodiments of the present application can implement a battery charging method in which the working state of a current control unit is switched to be in a first state or a second state according to the temperature condition of the battery. When the temperature of the battery is below the first preset temperature, the current control unit is controlled to be in the first state in which the semiconductor device is reversely connected in the circuit, and at this point the current control unit is capable of blocking the passage of current, so that the charging power supply stops charging the power battery and the charging power supply forms a loop with a battery heating module to supply power to the battery heating module to heat the battery; and when the temperature of the battery reaches the first preset temperature, the current control unit is controlled to be in the second state in which the semiconductor device is disconnected from the circuit or forwardly connected in the circuit, and at this point the current control unit allows the passage of current, so that the charging power supply forms a loop with the power battery and the current control unit to charge the power battery and the charging power supply is disconnected from the battery heating module and stops supplying power to the battery heating module. In this way, it is possible to request the charging current for heating during the process of low-temperature charging of the battery without changing the communication protocol, and at the same time, it is possible to effectively ensure that the charging current for heating does not flow into the power battery, thus avoiding damages to the battery; and after the battery is heated to room temperature or the required working temperature of the battery, by switching the current control unit for conventional fast charging, the charging power supply can perform safe and efficient low-temperature charging of low-temperature and low-SOC batteries.

In a possible embodiment, controlling, when the temperature of the battery reaches the first preset temperature, the current control unit to be in the second state includes: sending the first charging request when the temperature of the battery reaches the first preset temperature, wherein the first charging request includes: the first charging current being 0.

In the above embodiment, when the battery has been heated to the first preset temperature, the first charging current is requested to be 0, and then the current control unit is controlled to switch to the second state, that is, during the switch of the working state of the current control unit, the charging current for heating is reduced to 0, which prevents the battery from being damaged due to the current flowing into the battery in the process of switching the working state of the current control unit, thus further ensuring the safety of low-temperature charging of the battery.

In a possible embodiment, the current control unit includes the semiconductor device and a first relay, and controlling, when the temperature of the battery is below the first preset temperature, the current control unit to be in the first state includes: controlling, when the temperature of the battery is below the first preset temperature, the first relay to be turned off, wherein one end of the first relay is connected to the battery and the other end of the first relay is connected to the charging power supply, and the semiconductor device is connected in parallel with the first relay.

In a possible embodiment, the current control unit includes the semiconductor device and a first relay, and controlling, when the temperature of the battery reaches the first preset temperature, the current control unit to be in the second state includes: controlling, when the temperature of the battery reaches the first preset temperature, the first relay to be turned on, wherein one end of the first relay is connected to the battery and the other end of the first relay is connected to the charging power supply, and the semiconductor device is connected in parallel with the first relay.

In the above embodiments, the current control unit includes the first relay and the semiconductor device, and the first relay is connected in parallel with the semiconductor device. When the first relay is turned off, the semiconductor device is reversely connected in the circuit, so that the current control unit is in the first state; and when the first relay is turned on, the semiconductor device may be bypassed, so that the current control unit is in the second state. By controlling the turning on or off of the first relay, the connection of the semiconductor device into and out of the circuit can be realized, thus switching the working state of the current control unit.

In a possible embodiment, the current control unit includes a bidirectional semiconductor device, and controlling, when the temperature of the battery reaches the first preset temperature, the current control unit to be in the second state includes: controlling, when the temperature of the battery reaches the first preset temperature, the bidirectional semiconductor device to commutate, so that the bidirectional semiconductor device is forwardly connected in the circuit.

In the above embodiment, the current control unit includes the bidirectional semiconductor device, and by controlling and switching the direction of the bidirectional semiconductor device, it is possible to achieve the reverse connection into the circuit when the temperature of the battery is below the first preset temperature and the forward connection into the circuit when the temperature of the battery reaches the first preset temperature, which saves the relay in the current control unit and makes the connection and control of the circuit simpler, thus ensuring fast and efficient switching of the working state of the current control unit.

In a second aspect, the present application provides a vehicle electrical system, including: a current control unit that includes a semiconductor device, one end of the current control unit being connected to a battery and the other end being connected to a charging power supply; a control module for controlling, when the temperature of the battery is below a first preset temperature, the current control unit to be in a first state, wherein the first state includes a state in which the semiconductor device is reversely connected in a circuit; and a communication module for sending a first charging request, wherein the first charging request includes a first charging current, which is a current required to heat the battery to the first preset temperature, wherein the control module is further used for controlling, when the temperature of the battery reaches the first preset temperature, the current control unit to be in a second state, wherein the second state includes a state in which the semiconductor device is disconnected from the circuit or a state in which the semiconductor device is forwardly connected in the circuit; and the communication module is further used for sending a second charging request, wherein the second charging request includes a second charging current at which the battery is charged.

The above embodiment provides a vehicle electrical system, and by using a current control unit in the vehicle electrical system, the working state of the current control unit is made to be in a first state or a second state according to the temperature condition of the battery. When the temperature of the battery is below a first preset temperature, the current control unit is in the first state in which the semiconductor device is reversely connected in the circuit, and at this point the current control unit is capable of blocking the passage of current, so that the charging power supply forms a loop with a battery heating module to supply power to the battery heating module to heat the battery; and when the temperature of the battery reaches the first preset temperature, the current control unit is in the second state in which the semiconductor device is disconnected from the circuit or forwardly connected in the circuit, and at this point the current control unit allows the passage of current, so that the charging power supply forms a loop with the power battery and the current control unit to perform conventional charging on the power battery, and the charging power supply is disconnected from the battery heating module and thus stops supplying power to the battery heating module. In this way, it is possible to request the charging current for heating during the process of low-temperature charging of the battery without changing the communication protocol, and at the same time, it is possible to effectively ensure that the charging current for heating does not flow into the power battery, thus avoiding damages to the battery; and after the battery is heated to room temperature or the required working temperature of the battery, by switching the current control unit for conventional fast charging, the charging pile can perform safe and efficient low-temperature charging of low-temperature and low-SOC batteries.

In a possible embodiment, the communication module is further used for sending the first charging request when the temperature of the battery reaches the first preset temperature, wherein the first charging request includes: the first charging current being 0.

In the above embodiment, when the battery has been heated to the first preset temperature, the communication module requests the first charging current to be 0, and then the control module controls the current control unit to be in the second state, that is, during the switch of the working state of the current control unit, the charging current is reduced to 0, which prevents the battery from being damaged due to the current flowing into the battery in the process of switching the working state of the current control unit, thus further ensuring the safety of low-temperature charging of the battery.

In a third aspect, the present application provides a vehicle electrical system including a battery and a current control unit that includes a first relay and a semiconductor device, one end of the first relay being connected to the battery and the other end of the first relay being connected to a charging power supply; and the semiconductor device being connected in parallel with the first relay, wherein when the temperature of the battery is below the first preset temperature, the current control unit is in a first state in which the first relay is turned off; and when the temperature of the battery reaches the first preset temperature, the current control unit is in a second state in which the first relay is turned on.

In a possible embodiment, the above current control unit includes: the first relay, the semiconductor device, and a second relay, one end of the first relay being connected to the battery and the other end of the first relay being connected to the charging power supply; the semiconductor device being connected in parallel with the first relay; and the second relay being connected to a branch where the semiconductor device is located, wherein when the temperature of the battery is below the first preset temperature, the current control unit is in the first state in which the first relay is turned off and the second relay is turned on; and when the temperature of the battery reaches the first preset temperature, the current control unit is in a second state in which the first relay is turned on and the second relay is turned off.

In the above embodiment, the current control unit includes the first relay and the semiconductor device, and further includes the second relay, wherein the second relay is connected to the branch where the semiconductor device is located and is connected in series with the semiconductor device, and is capable of controlling the connection of the semiconductor device into and out of the circuit. By using the first relay connected in parallel with the semiconductor device and the second relay connected in series with the semiconductor device to simultaneously control the connection of the semiconductor device into and out of the circuit, the safety of the circuit can be improved. When the relay on either branch fails or malfunctions, the relay on the other branch is capable of continuing to work, which ensures the switching of the connection of the semiconductor device into and out of the circuit, thus increasing the reliability of this electrical system.

In a fourth aspect, the present application provides a battery management system including a processor and a memory, wherein the memory is used for storing a computer program, and the processor is used for invoking the computer program to execute the method of any one of the possible embodiments in the first aspect described above.

In a fifth aspect, the present application provides a storage medium for storing a computer program, wherein the computer program is used for executing the method of any one of the possible embodiments in the first aspect described above.

In a sixth aspect, the present application provides a vehicle including the vehicle electrical system of any one of the possible embodiments in the first aspect and the second aspect described above.

DESCRIPTION OF DRAWINGS

In order to illustrate the technical solutions of the embodiments of the present application more clearly, the following briefly introduces the drawings required in the embodiments of the present application. Obviously, the drawings described below are only some embodiments of the present application. For those of ordinary skill in the art, other drawings may also be obtained according to the drawings without any creative effort.

DETAILED DESCRIPTION

The implementations of the present application need to be further described in detail below with reference to the accompanying drawings and embodiments. The following detailed description of the embodiments and the accompanying drawings are used to illustrate the principles of the present application by way of example, but should not be used to limit the scope of the present application, that is, the present application is not limited to the described embodiments.

In the description of the present application, it should be noted that unless otherwise specified, "multiple" means more than two; the orientation or location relationships indicated by the terms "up," "down," "left," "right," "inside," "outside," etc., are only for convenience and simplification of the description of the present application, but do not indicate or imply that the devices or elements referred to must have a particular orientation, be constructed and operate in a particular orientation, and therefore cannot be construed as a limitation of the present application. In addition, the terms "first," "second" and "third" are only used for descriptive purposes, and cannot be construed as indicating or implying relative importance. "Vertical" does not mean being vertical in the strict sense, but within the allowable range of error. "Parallel" does not mean being parallel in the strict sense, but within the allowable range of error.

Orientation words appearing in the following description are all directions shown in the drawings, and do not limit the specific structure of the present application. In the description of the present application, it should also be noted that, unless otherwise expressly specified and defined, the terms "install," "connected" and "connect" should be understood in a broad sense, for example, they may be fixedly connected, detachably connected or integrally connected; and they may be directly connected or indirectly connected through an intermediate medium. For those of ordinary skill in the art, the specific meanings of the above terms in the present application may be understood according to specific circumstances.

Figure 1:
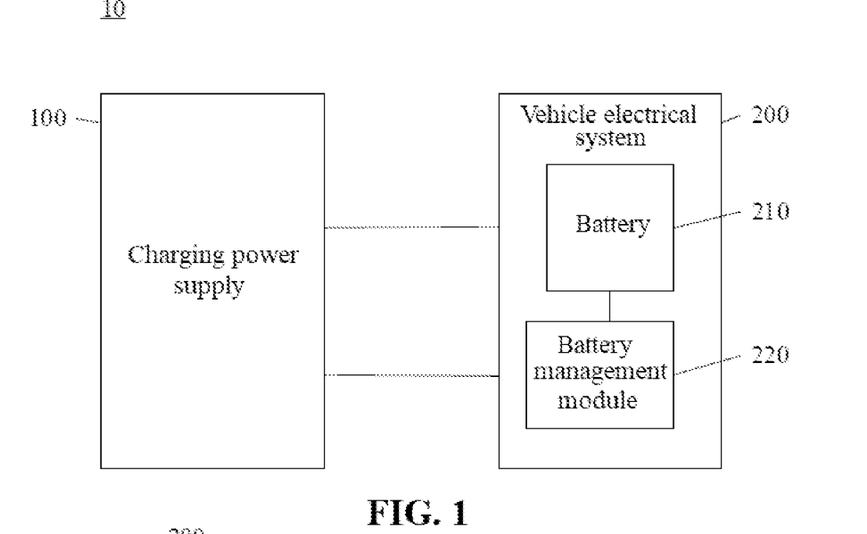
FIG. 1 is a schematic structural diagram of a charging system disclosed in an embodiment of the present application.

FIG. 1 illustrates a schematic structural diagram of a charging system to which embodiments of the present application are applicable.

As shown in FIG. 1, the charging system 10 may include: a charging power supply 100 and a vehicle electrical system 200. Optionally, the vehicle may be an electric vehicle, including an all-electric vehicle and a plug-in hybrid electric vehicle.

Optionally, at least one battery pack may be provided in the vehicle electrical system 200, and the at least one battery pack as a whole may be collectively referred to as a power battery, i.e., a battery 210. In terms of the type of the battery, this power battery may be any type of battery, including but not limited to: lithium ion battery, lithium metal battery, lithium sulfur battery, lead acid battery, nickel cadmium battery, nickel metal hydride battery, or lithium air battery and the like. In terms of the scale of the battery, the power battery in the embodiments of the present application may be a battery cell/cell, or a battery module or a battery pack, wherein the battery module or battery pack may be formed by multiple batteries connected in series or parallel. In the embodiments of the present application, no specific limitation is imposed on the specific type and scale of the power battery.

In addition, in order to intelligently manage and maintain the power battery, to prevent the battery from overcharging and overdischarging, and to prolong the service life of the battery, the vehicle electrical system 200 is generally provided with a battery management module 220 for controlling the vehicle electrical system and monitoring the state of the battery 210. The battery management module may be a battery management system (BMS) or a domain control unit (DCU). Optionally, the battery management module 220 may be integrated with the power battery and provided in the same equipment or device, or the battery management module 220 may also be provided outside the power battery as an independent equipment/device.

Specifically, the charging power supply 100 is a device for supplementing electric energy for the battery 210 in the vehicle electrical system 200. The charging power supply 100 in the embodiments of the present application may be a fast charging pile, a charging pile supporting a vehicle to grid (V2G) mode, or the like.

Optionally, the charging power supply 100 may be connected to the battery 210 through an electric wire, and connected to the battery management module 220 through a communication wire, wherein the communication wire is used to realize information interaction between the charging power supply 100 and the battery management module 220.

As an example, the communication wire includes, but is not limited to, a controller area network (CAN) communication bus or a daisy chain communication bus.

Optionally, in addition to communicating with the battery management module 220 through a communication wire, the charging power supply 100 may also communicate with the battery management module 220 through a wireless network. In the embodiments of the present application, no specific limitation is imposed on the type of communication between the charging power supply 100 and the battery management module 220.

The power batteries for new energy vehicles on the market are mostly rechargeable storage batteries, and the most common ones are lithium batteries, such as lithium-ion batteries or lithium-ion polymer batteries, and the like. The temperature of the battery and the uniformity of the temperature field have a great influence on the performance and service life of the power battery. If the power battery works at too low a temperature or the power battery is charged in a low-temperature environment, lithium plating in the battery may be caused, resulting in performance degradation of the battery, which seriously affects the capacity and service life of the battery. Therefore, when the battery is charged in a low-temperature environment, the battery needs to be heated first.

At present, when the battery is in a low-temperature environment, if the battery is in a low-SOC state, it cannot be discharged to the outside world and the battery heating module cannot work. In this case, the battery heating module can only be powered by means of slow charging through the on-board charger, so as to heat the battery, and after the temperature of the battery rises to a certain value, the battery can be charged normally. However, this method has its limitations, as there are no slow charging ports on some vehicles, and it is impossible to supply power to the battery heating module by means of slow charging through the on-board charger. For example, when a commercial vehicle has only a fast charging port, the vehicle may be unchargeable and unusable in the case of low-temperature and low-SOC batteries.

For a fast charging pile, the conventional heating and charging method requires the change of the communication protocol so that the pile can recognize that the vehicle is in a low-temperature environment, thus enabling the pile to have the auxiliary heating function. When this method requires the development of a new fast charging pile and additional addition or modification of the communication protocol during charging, the standard international protocol is not applicable, and the existing fast charging piles on the market still cannot be widely used.

Therefore, in order to solve the above problem and enable the charging piles to safely and efficiently charge low-SOC power batteries in low-temperature environments, embodiments of the present application provide a battery charging control method and a vehicle electrical system.

Figure 2:
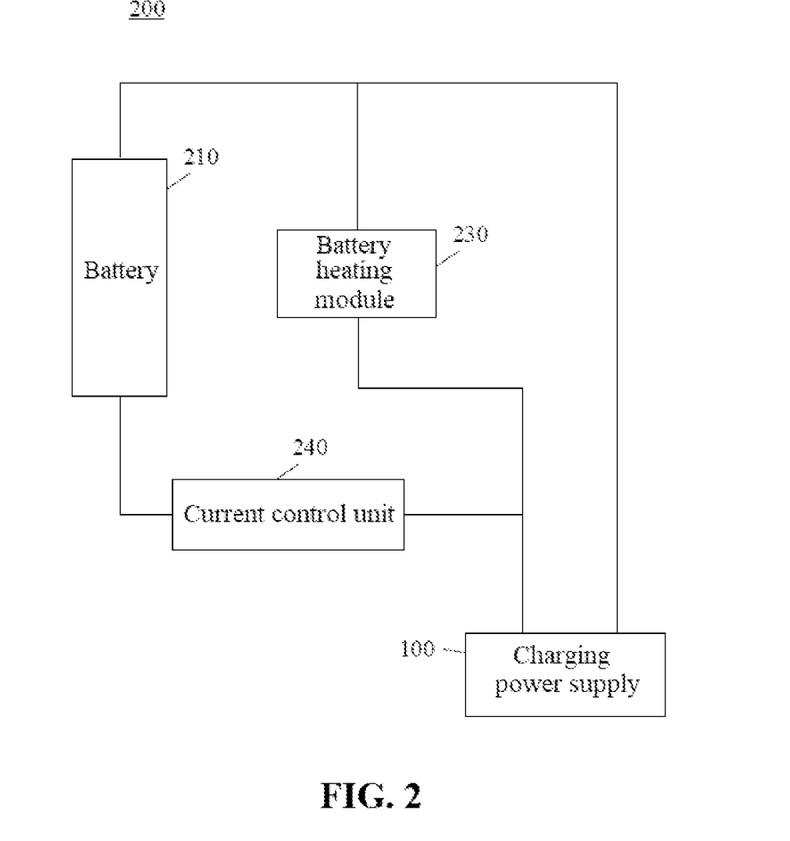
FIG. 2 is a schematic structural diagram of the connection between a vehicle electrical system disclosed in an embodiment of the present application and a charging power supply.

FIG. 2 illustrates a schematic structural diagram of the connection between a vehicle electrical system 200 of an embodiment of the present application and a charging power supply 100. The vehicle electrical system 200 includes a battery 210, a battery heating module 230, and a current control unit 240, wherein one end of the current control unit 240 is connected to the battery 210 and the other end is connected to the charging power supply 100; and the battery heating module 230 is connected in parallel with the battery 210 and the current control unit 240, one end of the battery heating module 230 being connected to the battery 210 and the charging power supply 100, and the other end being connected to the current control unit 240 and the charging power supply 100.

Figure 3:
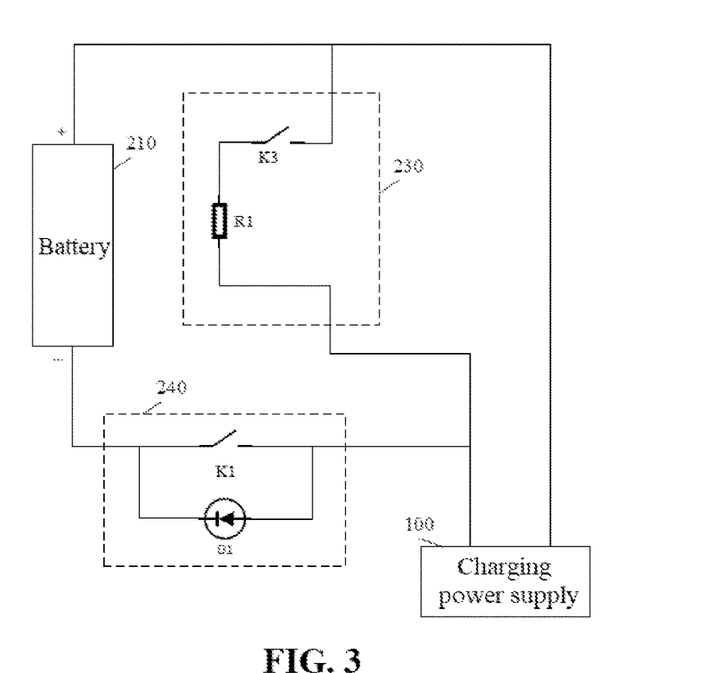
FIG. 3 is a schematic structural diagram of the connection between another vehicle electrical system disclosed in an embodiment of the present application and a charging power supply.

Optionally, as shown in FIG. 3, the battery heating module 230 includes a third relay K3 and a heater R1, the third relay K3 being connected in series with the heater R1, wherein the third relay K3 is used for controlling the battery heating module 230 to be connected into or disconnected from the circuit, and the heater R1 is used for heating the battery 210, which may be a PTC heater or a heating film. In the embodiments of the present application, no specific limitation is imposed on either the specific type or scale of the heater in the battery heating module 230.

Figure 4:
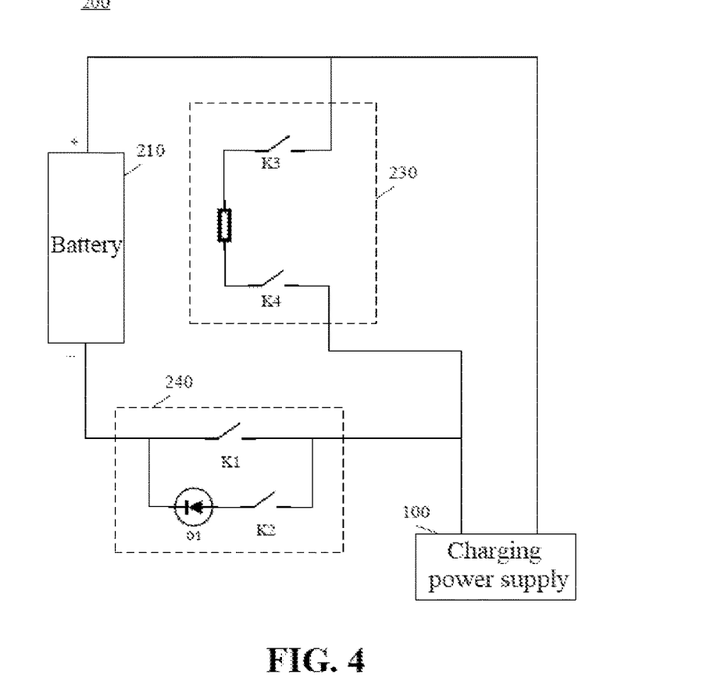
FIG. 4 is a schematic structural diagram of the connection between yet another vehicle electrical system disclosed in an embodiment of the present application and a charging power supply.

Optionally, as shown in FIG. 4, the battery heating module 230 may further include a fourth relay K4, wherein the third relay K3, the fourth relay K4, and the heater R1 are connected in series, and the third relay K3 and the fourth relay K4 are provided at both ends of the heater R1, respectively. The third relay K3 and the fourth relay K4 cooperate to control the battery heating module 230 to be connected into or out of the circuit, which enhances the safety and reliability of the circuit system.

The current control unit 240 includes a semiconductor device. Optionally, as shown in FIG. 3, the current control unit 240 includes a first relay K1 and a semiconductor device D1, wherein one end of the first relay K1 is connected to the battery 210 and the other end of the first relay K1 is connected to the charging power supply 100; and the semiconductor device D1 is connected in parallel with the first relay K1.

Optionally, as shown in FIG. 4, the current control unit 240 includes the first relay K1 and the semiconductor device D1, and may further include a second relay K2, wherein one end of the first relay K1 is connected to the battery 210 and the other end of the first relay K1 is connected to the charging power supply 100; the semiconductor device D1 is connected in parallel with the first relay K1; and the second relay K2 is connected to a branch where the semiconductor device D1 is located.

Optionally, the semiconductor device D1 in the current control unit 240 may be set as a diode, a silicon controlled rectifier, a bidirectional IGBT or other semiconductor devices, that is, with the unidirectional conductivity of the semiconductor, by reversely connecting the semiconductor device D1 in the circuit, current blocking can be achieved; and by adjusting the direction of connection of the semiconductor device D1 in the circuit, the current control unit 240 can be arranged on the positive bus or the negative bus of the battery 210. The embodiment of the present application takes the case where the current control unit 240 is disposed on the negative bus of the battery 210 as an example.

Optionally, the semiconductor device D1 in the current control unit 240 may be a bidirectional semiconductor device.

Figure 5:
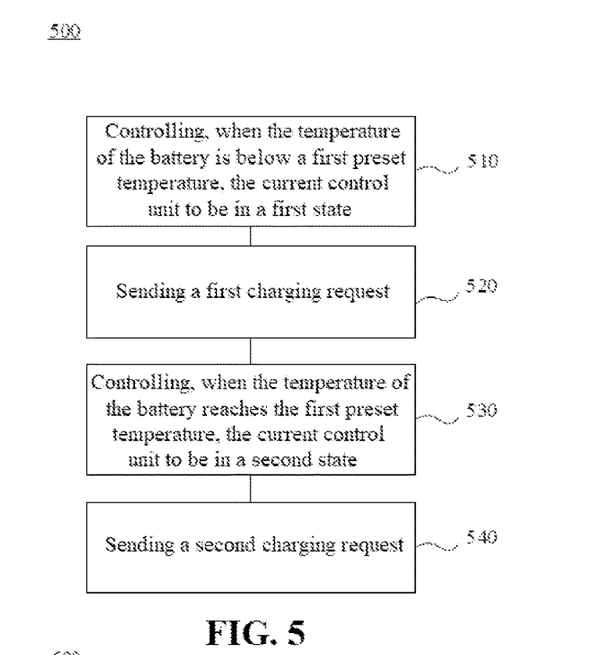
FIG. 5 is a schematic flow chart of a battery charging control method disclosed in an embodiment of the present application.

FIG. 5 illustrates a charging control method 500 according to an embodiment of the present application, which is used for heating and charging the battery 210. The method 500 may specifically include some or all of the following steps.

Step 510: controlling, when the temperature of the battery is below a first preset temperature, the current control unit to be in a first state.

Here, the first state is a state in which the semiconductor device is reversely connected in a circuit. Specifically, the first preset temperature is the allowable temperature for charging the battery 210, and when the temperature of the battery 210 is below the first preset temperature, the battery 210 is in a low-temperature state and needs to be heated before charging. In this case, the first relay K1 is turned off to reversely connect the semiconductor device D1 into the circuit, thereby controlling the current control unit 240 to block the passage of current, so that the charging power supply 100 stops charging the battery 210, and at the same time, the charging power supply 100 forms a loop with the battery heating module 230, so that the charging power supply 100 supplies power to the battery heating module 230 to heat the battery 210.

Optionally, as shown in FIG. 4, the current control unit 240 further includes the second relay K2. When the temperature of the battery 210 is below the first preset temperature, the first relay K1 is turned off and the second relay K2 is turned on to reversely connect the semiconductor device D1 into the circuit, thereby controlling the current control unit 240 to block the passage of current.

Optionally, when the semiconductor device D1 in the current control unit 240 is a bidirectional semiconductor device, it is possible to directly control to keep the direction of the bidirectional semiconductor device D1 in the circuit in the reverse direction with respect to the current, thereby blocking the passage of the current.

When the current control unit 240 is in the first state, the battery heating module 230 is connected into the circuit to form a loop with the charging power supply 100. Specifically, the third relay K3 and the fourth relay K4 are turned on, so that the charging power supply 100 supplies power to the battery heating module 230 to heat the battery 210.

Step 520: sending a first charging request.

Here, the first charging request includes a first charging current, which is a current required to heat the battery to the first preset temperature, and may be set according to the power of an electrical appliance such as a battery heating module. Specifically, at this time, the charging power supply 100 is requested to send the first charging current to heat the battery 210 to the first preset temperature, so that conventional charging can be performed on the battery 210 subsequently.

At this time, the first charging current output by the charging power supply 100 flows into the vehicle electrical system 200. Since the semiconductor device is reversely connected in the circuit, the current control unit 240 is in the first state, that is, the current control unit 240 can block the passage of current, the first charging current can flow into the battery heating module 230 to heat the battery 210 without flowing into the battery 210, thus avoiding damages to the battery. In addition, since the battery 210 remains in conduction with the circuit of the charging power supply 100, the vehicle electrical system 200 can successfully establish a connection with the charging power supply 100 and request the charging current without the need to additionally add or modify the communication protocol.

Step 530: controlling, when the temperature of the battery reaches the first preset temperature, the current control unit to be in a second state.

Here, the second state is a state in which the semiconductor device is disconnected from the circuit or a state in which the semiconductor device is forwardly connected in the circuit. Specifically, when the temperature of the battery 210 reaches the first preset temperature, conventional charging may be performed on the battery 210. At this time, the first relay K1 is turned on to connect the semiconductor device out of the circuit, that is, the semiconductor device D1 is short-circuited, so that the current control unit 240 is controlled to allow the passage of current.

Optionally, as shown in FIG. 4, the current control unit 240 further includes the second relay K2. When the temperature of the battery 210 reaches the first preset temperature, the first relay is turned on and the second relay K2 is turned off to connect the semiconductor device D1 out of the circuit, that is, the semiconductor device D1 is bypassed, thereby controlling the current control unit 240 to allow the passage of current.

Optionally, when the semiconductor device D1 in the current control unit 240 is a bidirectional semiconductor device, it is possible to directly control to keep the direction of the bidirectional semiconductor device D1 in the circuit in the forward direction with respect to the current, thereby allowing the passage of the current.

At this time, the battery heating module 230 is disconnected from the circuit. Specifically, the third relay K3 in the battery heating module 230 is turned off or the third relay K3 and the fourth relay K4 are turned off at the same time, so as to bypass the current heating module 230, so that the charging power supply 100 performs conventional charging on the battery 210.

Step 540: sending a second charging request.

The second charging request includes a second charging current. Specifically, the charging power supply 100 is requested to send the second charging current according to the charging demand of the battery 210 to charge the battery 210.

At this time, the battery heating module 230 is bypassed and the current control unit 240 is in the second state, that is, the current control unit 240 allows the passage of current, and the second charging current output by the charging power supply 100 can flow to the battery 210 for conventional charging.

In this embodiment, a current control unit is provided in the vehicle electrical system. When the temperature of the battery is below the first preset temperature and thus the battery needs to be heated, the semiconductor device is controlled to be reversely connected in the circuit, and thus the current control unit is in the first state, that is, the current control unit blocks the passage of current. In this way, it is possible to keep the battery to be connected to the charging power supply and successfully request the charging power supply to output charging current without additionally adding or modifying the communication protocol, while effectively preventing the battery from being damaged due to the first charging current output from the charging power supply flowing into the battery. When the temperature of the battery is detected to reach the first preset temperature and thus charging is allowed, the semiconductor device is controlled to be disconnected from the circuit or forwardly connected in the circuit, so that the current control unit is in the second state, i.e., the current control unit allows passage of current. In this way, when the temperature of the battery reaches the temperature at which charging is allowed, the vehicle electrical system can be directly put into the normal fast charging state without affecting the charging efficiency of the battery. By setting the current control unit and controlling its working state, the charging power supply can perform safe and efficient low-temperature heating and charging of the low-temperature and low-SOC battery.

Figure 6:
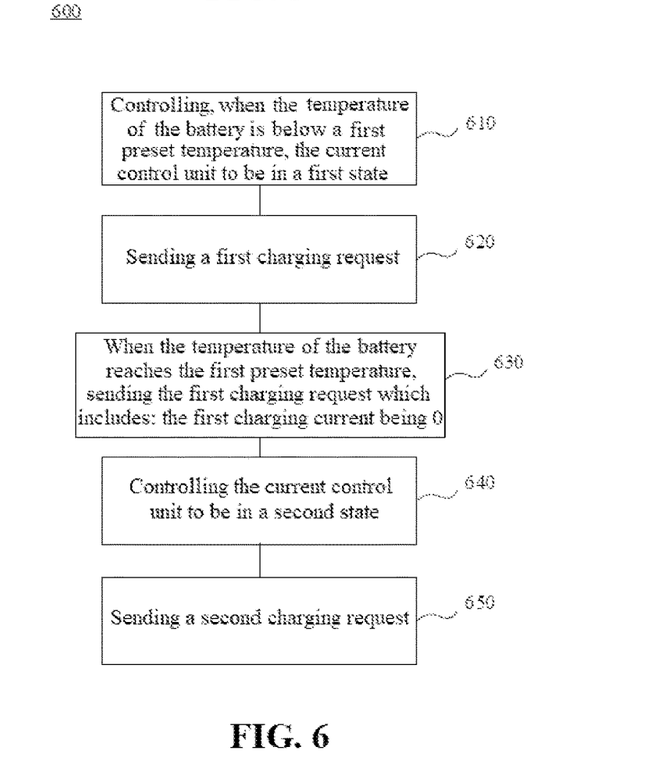
FIG. 6 is a schematic flow chart of another battery charging control method disclosed in an embodiment of the present application.

Further, the charging control method in the above embodiment may be extended to the charging control method 600 shown in FIG. 6, and the method 600 may specifically include some or all of the following steps.

Step 610: controlling, when the temperature of the battery is below a first preset temperature, the current control unit to be in a first state.

Here, the first state is a state in which the semiconductor device is reversely connected in a circuit. The specific execution is similar to that in the method 500 and will not be repeated here.

Step 620: sending a first charging request.

Here, the first charging request includes a first charging current, which is a current required to heat the battery to the first preset temperature, and may be set according to the power of an electrical appliance such as a battery heating module. Specifically, at this time, the charging power supply 100 is requested to send the first charging current to heat the battery 210 to the first preset temperature, so that conventional charging can be performed on the battery 210 subsequently.

Step 630: sending the first charging request when the temperature of the battery reaches the first preset temperature, which includes: the first charging current being 0.

Specifically, when the temperature of the battery reaches the first preset temperature, the first charging current output from the charging power supply 100 is requested to be reduced to 0, and then the working state of the current control unit 240 is switched to the second state, that is, during the switch of the working state of the current control unit 240, the charging current for heating is reduced to 0, which prevents the power battery from being damaged due to the current flowing into the power battery in the process of switching the working state of the current control unit, thus further ensuring the safety of low-temperature charging of the battery.

Step 640: controlling the current control unit to be in the second state.

Here, the second state is a state in which the semiconductor device is disconnected from the circuit or a state in which the semiconductor device is forwardly connected in the circuit. The specific execution is the same as that in the method 500 and will not be repeated here.

Step 650: sending a second charging request.

The second charging request includes a second charging current. Specifically, the charging power supply 100 is requested to send the second charging current according to the charging demand of the battery 210 to charge the battery 210.

In this embodiment, when the temperature of the battery has been heated to the first preset temperature, the first charging current is requested to be 0, and then the current control unit is controlled to be in the second state, that is, during the switch of the working state of the current control unit, the charging current is reduced to 0, which prevents the power battery from being damaged due to the current flowing into the power battery in the process of switching the working state of the current control unit, thus further ensuring the safety of low-temperature charging of the battery.

Figure 7:
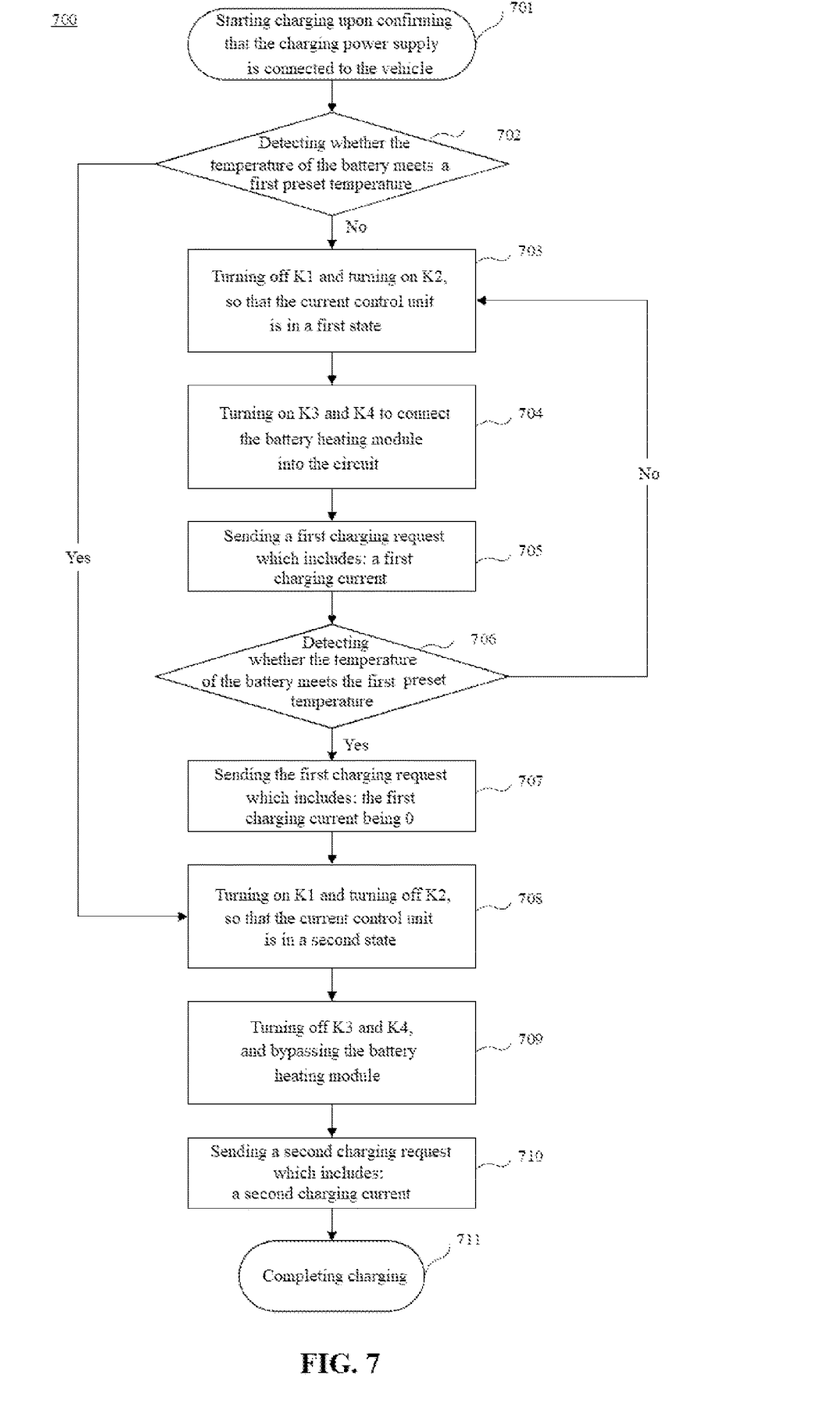
FIG. 7 is a schematic flow chart of yet another battery charging control method disclosed in an embodiment of the present application.

FIG. 7 illustrates a schematic flow chart of a possible implementation based on the above charging control method, wherein by controlling the working state of the current control unit, the charging power supply can perform safe and efficient low-temperature charging of low-temperature and low-SOC batteries. Taking the vehicle electrical system illustrated in FIG. 4 as an example, the method 700 may specifically include the following steps:

Step 701: starting charging upon confirming that the charging power supply is connected to the vehicle.

Step 702: detecting whether the temperature of the battery meets the first preset temperature.

The first preset temperature is the allowable temperature for charging the battery 210. If the temperature of the battery 210 meets the first preset temperature, the battery 210 does not need to be heated, and the process proceeds to step 708; and if the temperature of the battery 210 does not meet the first preset temperature, the process proceeds to step 703 to heat the battery 210.

Step 703: turning off K1 and turning on K2, so that the current control unit is in the first state.

Here, the first state is a state in which the semiconductor device is reversely connected in a circuit. At this time, the first relay K1 is turned off and the second relay K2 is turned on.

Step 704: turning on K3 and K4 to connect the battery heating module into the circuit.

Step 705: sending a first charging request, which includes: a first charging current.

The first charging current is a current required to heat the battery 210 to the first preset temperature, and may be set according to the power of the battery heating module 230. At this time, the charging power supply 100 is requested to send the first charging current to heat the battery 210 to the first preset temperature, so that conventional charging can be performed on the battery 210 subsequently.

Step 706: detecting whether the temperature of the battery meets the first preset temperature.

After the battery 210 is heated, detection of the heating effect is performed. If the temperature of the battery 210 meets the first preset temperature, heating is stopped, and the process proceeds to step 707; and if not, the heating of the battery 210 is continued, and the process proceeds to step 703.

Step 707: sending the first charging request, which includes: the first charging current being 0.

When the temperature of the battery reaches the first preset temperature, the first charging current output from the charging power supply 100 is requested to be reduced to 0, and then the working state of the current control unit 240 is switched to the second state, that is, during the switch of the working state of the current control unit 240, the charging current is reduced to 0.

Step 708: closing K1 and turning off K2, so that the current control unit is in the second state.

Here, the second state is a state in which the semiconductor device is disconnected from the circuit. At this time, the first relay K1 is turned on and the second relay K2 is turned off.

Step 709: turning off K3 and K4, and bypassing the battery heating module.

Step 710: sending a second charging request, which includes: a second charging current.

At this time, the battery heating module is bypassed and the current control unit 240 is in the second state, that is, the passage of current is allowed, and the charging power supply 100 is requested to output the second charging current to perform conventional charging on the battery 210.

Step 711: completing charging.

From the above possible methods, it can be seen that by controlling the working state of the current control unit, it is possible to keep the battery to be connected to the charging power supply and successfully request the charging power supply to output charging current without additionally adding or modifying the communication protocol, while preventing the battery from being damaged due to the current output from the charging power supply flowing into the battery during the process of low-temperature charging, so that the charging power supply can perform safe and efficient low-temperature charging of low-temperature and low-SOC batteries.

An embodiment of the present application further provides a vehicle electrical system, including a current control unit, a control module, and a communication module. The current control unit includes a semiconductor device, and one end of the current control unit is connected to a battery and the other end is connected to a charging power supply; the control module is used for controlling, when the temperature of the battery is below a first preset temperature, the current control unit to be in a first state, wherein the first state is a state in which the semiconductor device is reversely connected in a circuit; and the communication module is used for sending a first charging request, wherein the first charging request includes a first charging current, which is a current required to heat the battery to the first preset temperature. The control module is further used for controlling, when the temperature of the battery reaches the first preset temperature, the current control unit to be in a second state, wherein the second state is a state in which the semiconductor device is disconnected from the circuit; and the communication module is further used for sending a second charging request, wherein the second charging request includes a second charging current at which the battery is charged.

Specifically, the control module is connected to the battery heating module 230 and the current control unit 240 in the vehicle electrical system 200 for use in controlling the turning on and off of K1, K2, K3, and K4, thereby controlling the battery heating module 230 to be connected into the circuit or to be bypassed, as well as controlling the current control unit 240 to be in the first state or the second state. The communication module is used for information interaction with the charging power supply 100, and the communication manner includes, but is not limited to, controller area network (CAN) communication or daisy chain communication.

Figure 8:
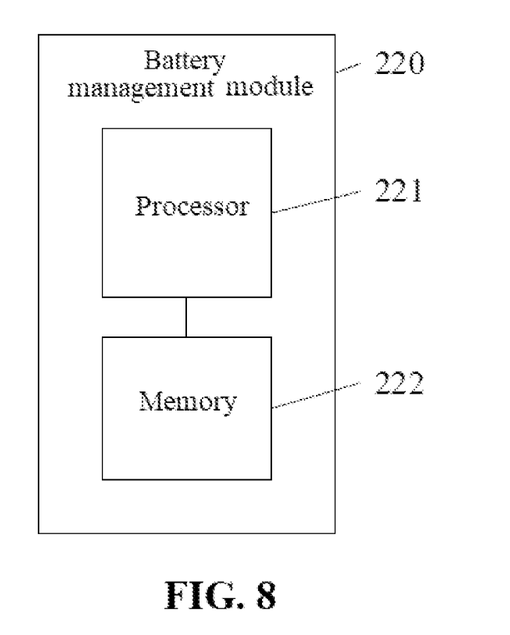
FIG. 8 is a schematic structural diagram of a battery management module disclosed in an embodiment of the present application.

As shown in FIG. 8, an embodiment of the present application further provides a battery management module 220, including a processor 221 and a memory 222, wherein the memory 222 is used for storing a computer program, and the processor 221 is used for invoking the computer program to execute the charging control method in any one of the aforementioned embodiments of the present application.

An embodiment of the present application further provides a readable storage medium for storing a computer program, wherein the computer program is used for executing the charging control method in any one of the aforementioned embodiments of the present application.

An embodiment of the present application further provides a vehicle, including the vehicle electrical system in any one of the aforementioned embodiments of the present application.

It should be understood that the specific examples herein are intended only to assist those skilled in the art to better understand the embodiments of the present application and are not intended to limit the scope of the embodiments of the present application.

It should also be understood that in the various embodiments of the present application, the order in which the processes are performed shall be determined by their functions and intrinsic logic, and shall not constitute any limitation to the implementation process of the embodiments of the present application. The various implementations described in the present specification may be implemented individually or in combination, which are not limited in the embodiments of the present application.

Although the present application has been described with reference to some embodiments, various improvements can be made thereto and components thereof can be replaced with equivalents without departing from the scope of the present application. In particular, the various technical features mentioned in the various embodiments can be combined in any way, as long as there is no structural conflict. The present application is not limited to the particular embodiments disclosed herein, but includes all technical solutions that fall within the scope of the claims.

The invention claimed is:

1. A battery charging control method applicable to a vehicle electrical system, wherein the vehicle electrical system comprises a battery heating module, and a current control unit that comprises a semiconductor device, a first relay, and a second relay, one end of the first relay being connected to a first end of a battery, another end of the first relay being connected to a first end of a charging power supply, one end of the semiconductor device being connected to the first end of the battery, another end of the semiconductor device being connected to one end of the second relay, another end of the second relay being connected to the first end of the charging power supply; and the battery heating module is connected in parallel with the battery and the current control unit, one end of the battery heating module being connected to the battery and the charging power supply, and the other end being connected to the current control unit and the charging power supply, the method comprising:

controlling, in response to a temperature of the battery being below a first preset temperature, the current control unit to be in a first state, wherein the charging power supply forms a loop with the battery heating module, and the charging power supply supplies power to the battery heating module to heat the battery; and the first state is a state in which the semiconductor device is reversely connected in a circuit, the first relay is turned off, the second relay is turned on, and the current control unit blocks a passage of current;

sending a first charging request to the charging power supply, wherein the first charging request comprises a first charging current, and the first charging current is a current required to heat the battery to the first preset temperature and entering the battery heating module;

controlling, in response to the temperature of the battery reaching the first preset temperature, the current control unit to be in a second state, wherein the second state is a state in which the semiconductor device is disconnected from the circuit or the semiconductor device is forwardly connected in the circuit, the first relay is turned on, the second relay is turned off, and the current control unit allows the passage of current; and sending a second charging request to the charging power supply, wherein the second charging request comprises a second charging current at which the battery is charged.

2. The control method according to claim 1, wherein controlling, in response to the temperature of the battery reaching the first preset temperature, the current control unit to be in the second state comprises:

sending the first charging request to the charging power supply in response to the temperature of the battery reaching the first preset temperature, wherein the first charging request comprises: the first charging current being 0.

3. The control method according to claim 1, wherein:
the current control unit further comprises a bidirectional semiconductor device; and
controlling, in response to the temperature of the battery reaching the first preset temperature, the current control unit to be in the second state comprises:
controlling, in response to the temperature of the battery reaching the first preset temperature, the bidirectional semiconductor device to commutate, so that the bidirectional semiconductor device is forwardly connected in the circuit.

4. The control method according to claim 1, wherein the semiconductor device comprises at least one of a diode, a silicon controlled rectifier, or a bidirectional insulated gate bipolar transistor (IGBT).

5. A vehicle electrical system, comprising:
a current control unit that comprises a semiconductor device, a first relay, and a second relay, one end of the first relay being connected to a first end of a battery, another end of the first relay being connected to a first end of a charging power supply, one end of the semiconductor device being connected to the first end of the battery, another end of the semiconductor device being connected to one end of the second relay, another end of the second relay being connected to the first end of the charging power supply;
a battery heating module, wherein the battery heating module is connected in parallel with the battery and the current control unit, one end of the battery heating module being connected to the battery and the charging power supply, and the other end being connected to the current control unit and the charging power supply;
a control module configured to:
control, in response to a temperature of the battery being below a first preset temperature, the current control unit to be in a first state, wherein the charging power supply forms a loop with the battery heating module, and the charging power supply supplies power to the battery heating module to heat the battery; and the first state is a state in which the semiconductor device is reversely connected in a circuit, the first relay is turned off, the second relay is turned on, and the current control unit blocks a passage of current; and control, in response to the temperature of the battery reaching the first preset temperature, the current control unit to be in a second state, wherein the second state is a state in which the semiconductor device is disconnected from the circuit or the semiconductor device is forwardly connected in the circuit, the first relay is turned on, the second relay is turned off, and the current control unit allows the passage of current; and a communication module configured to:

send a first charging request to the charging power supply, wherein the first charging request comprises a first charging current, and the first charging current is a current required to heat the battery to the first preset temperature and entering the battery heating module; and send a second charging request to the charging power supply, wherein the second charging request comprises a second charging current at which the battery is charged.

6. The system according to claim 5, wherein the communication module is further configured to send the first charging request to the charging power supply in response to the temperature of the battery reaching the first preset temperature, wherein the first charging request comprises: the first charging current being 0.

7. A vehicle electrical system, comprising:
a battery;
a battery heating module; and
a current control unit that comprises a first relay, a second relay, and a semiconductor device, one end of the first relay being connected to a first end of the battery, another end of the first relay being connected to a first end of a charging power supply, one end of the semiconductor device being connected to the first end of the battery, another end of the semiconductor device being connected to one end of the second relay, another end of the second relay being connected to the first end of the charging power supply; wherein the battery heating module is connected in parallel with the battery and the current control unit, one end of the battery heating module being connected to the battery and the charging power supply, and the other end being connected to the current control unit and the charging power supply;
wherein the current control unit is configured to be:
in a first state in response to a temperature of the battery being below a first preset temperature, the first relay being turned off and the second relay being turned on in the first state, wherein the semiconductor device is reversely connected in a circuit and the current control unit blocks a passage of current, the charging power supply forms a loop with the battery heating module, and the charging power supply supplies power to the battery heating module to heat the battery; and
in a second state in response to the temperature of the battery reaching the first preset temperature, the first relay being turned on and the second relay being turned off in the second state, wherein the semiconductor device is disconnected from the circuit or the semiconductor device is forwardly connected in the circuit and the current control unit allows the passage of current.

\* \* \* \* \*